(12) United States Patent
DeFusco

(10) Patent No.: US 11,313,391 B2
(45) Date of Patent: Apr. 26, 2022

(54) ACTUATOR SYSTEM FOR A FLY-BY-WIRE AIRCRAFT

(71) Applicant: Sikorsky Aircraft Corporation, Stratford, CT (US)

(72) Inventor: David Anthony DeFusco, Stratford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 487 days.

(21) Appl. No.: 15/977,033

(22) Filed: May 11, 2018

(65) Prior Publication Data

US 2019/0344885 A1 Nov. 14, 2019

(51) Int. Cl.
*F15B 20/00* (2006.01)

(52) U.S. Cl.
CPC ..... *F15B 20/008* (2013.01); *F15B 2211/8757* (2013.01)

(58) Field of Classification Search
CPC . F15B 2211/8757; F15B 20/008; B64C 13/42
See application file for complete search history.

(56) References Cited

U.S. PATENT DOCUMENTS

| 6,981,439 | B2 * | 1/2006 | Hart ..................... F15B 13/0403 91/509 |
| 7,003,949 | B2 | 2/2006 | Fenny et al. |
| 7,104,053 | B2 | 9/2006 | Gast |
| 7,828,245 | B2 | 11/2010 | Suisse et al. |
| 9,156,547 | B2 * | 10/2015 | Dickman .............. B64C 27/605 |
| 2016/0052620 | A1 | 2/2016 | Hussey |
| 2017/0283040 | A1 | 10/2017 | Judey |
| 2017/0307090 | A1 | 10/2017 | Defusco |

* cited by examiner

*Primary Examiner* — F Daniel Lopez
(74) *Attorney, Agent, or Firm* — Michael Best & Friedrich LLP

(57) ABSTRACT

An actuator system for an aircraft includes an actuator, and a control valve system operatively connected to the actuator. The control valve system includes a first direct drive valve (DDV) mechanically connected to a second DDV. A backup valve system is operatively connected to the actuator. The backup valve system includes one of an electro-hydraulic servovalve (EHSV) and a DDV.

19 Claims, 2 Drawing Sheets

ACTUATOR SYSTEM FOR A FLY-BY-WIRE AIRCRAFT

BACKGROUND

The subject matter disclosed herein generally relates to the art of air craft and, more particularly, to an actuator system for a fly-by-wire aircraft.

Many aircraft employ fly-by-wire (FBW) flight control systems (FCS) systems to control one or more systems. FBW systems may be used to control flight surfaces, throttle position, and the like. In a FBW system, an electrical or digital command is passed to a hydraulic or electromechanical actuator that controls a function. In aircraft, often times redundant FBW systems are employed to control a particular function. In this manner, in the event of a failure to one FBW system, a pilot or autonomous controller would not lose control of the function. Redundant systems often come with a cost, but provide increased safety. When multi-stage redundant hydraulic actuators are used in FBW FCS applications, a force fight condition may occur that drives a requirement to use larger actuators than may be necessary to control the function.

A force fight is a condition in which control valves of opposing hydraulic stages are not synced. The lack of synchronization leads to a differential pressure or force which builds up in chambers of the actuator. The force build up may cause increased stresses in various sections of the actuator. As a result, actuators are designed to be more robust so as to withstand the increased stresses. The more robust design may take the form of increased chamber wall thickness and/or the inclusion of additional sensors and associated wiring architecture. Thus, the more robust design typically results in weight and cost increases for the actuator.

BRIEF DESCRIPTION

According to an embodiment, an actuator system for an aircraft includes an actuator, and a control valve system operatively connected to the actuator. The control valve system includes a first direct drive valve (DDV) mechanically connected to a second DDV. A backup valve system is operatively connected to the actuator. The backup valve system includes one of an electro-hydraulic servovalve (EHSV) and a DDV.

In addition to one or more of the features described above, or as an alternative, in further embodiments the control valve system includes a first motor operatively connected to the first DDV and a second motor operatively connected to the second DDV, each of the first and second motors being operable to actuate both the first DDV and the second DDV.

In addition to one or more of the features described above, or as an alternative, in further embodiments the control valve system includes a first bypass valve connected to the first DDV, the first bypass valve establishing at least one of an active mode and a bypass mode of the first DDV and a second bypass valve connected to the second DDV, the second bypass valve establishing at least one of an active mode and a bypass mode of the second DDV.

In addition to one or more of the features described above, or as an alternative, in further embodiments a first solenoid valve operatively connected to the first bypass valve and a second solenoid valve operatively connected to the second bypass valve.

In addition to one or more of the features described above, or as an alternative, in further embodiments the backup valve system includes a bypass valve operatively connected to the one of the EHSV and DDV, the bypass valve establishing at least one of an active mode, a bypass mode, and a standby mode of the one of the EHSV and DDV.

In addition to one or more of the features described above, or as an alternative, in further embodiments the backup valve system further includes a solenoid valve operatively connected to the bypass valve.

In addition to one or more of the features described above, or as an alternative, in further embodiments the actuator comprises a triplex actuator.

In accordance with another exemplary embodiment, an aircraft includes a fuselage, at least one control member supported at the fuselage, and an actuator system operatively connected to the at least one control member. The actuator system includes an actuator, and a control valve system operatively connected to the actuator. The control valve system includes a first direct drive valve (DDV) mechanically connected to a second DDV. A backup valve system is operatively connected to the actuator. The backup valve system includes one of an electro-hydraulic servovalve (EHSV) and a DDV.

In addition to one or more of the features described above, or as an alternative, in further embodiments the control valve system includes a first motor operatively connected to the first DDV and a second motor operatively connected to the second DDV, each of the first and second motors being operable to actuate both the first DDV and the second DDV.

In addition to one or more of the features described above, or as an alternative, in further embodiments the control valve system includes a first bypass valve connected to the first DDV, the first bypass valve establishing at least one of an active mode and a bypass mode of the first DDV and a second bypass valve connected to the second DDV, the second bypass valve establishing at least one of an active mode and a bypass mode of the second DDV.

In addition to one or more of the features described above, or as an alternative, in further embodiments a first solenoid valve operatively connected to the first bypass valve and a second solenoid valve operatively connected to the second bypass valve.

In addition to one or more of the features described above, or as an alternative, in further embodiments the backup valve system includes a bypass valve operatively connected to the one of the EHSV and DDV, the bypass valve establishing at least one of an active mode, a bypass mode, and a standby mode of the one of the EHSV and DDV.

In addition to one or more of the features described above, or as an alternative, in further embodiments the backup valve system further includes a solenoid valve operatively connected to the bypass valve.

In addition to one or more of the features described above, or as an alternative, in further embodiments the aircraft comprises a vertical take-off and landing aircraft.

In addition to one or more of the features described above, or as an alternative, in further embodiments the actuator comprises a triplex actuator.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

DETAILED DESCRIPTION

Figure 1:
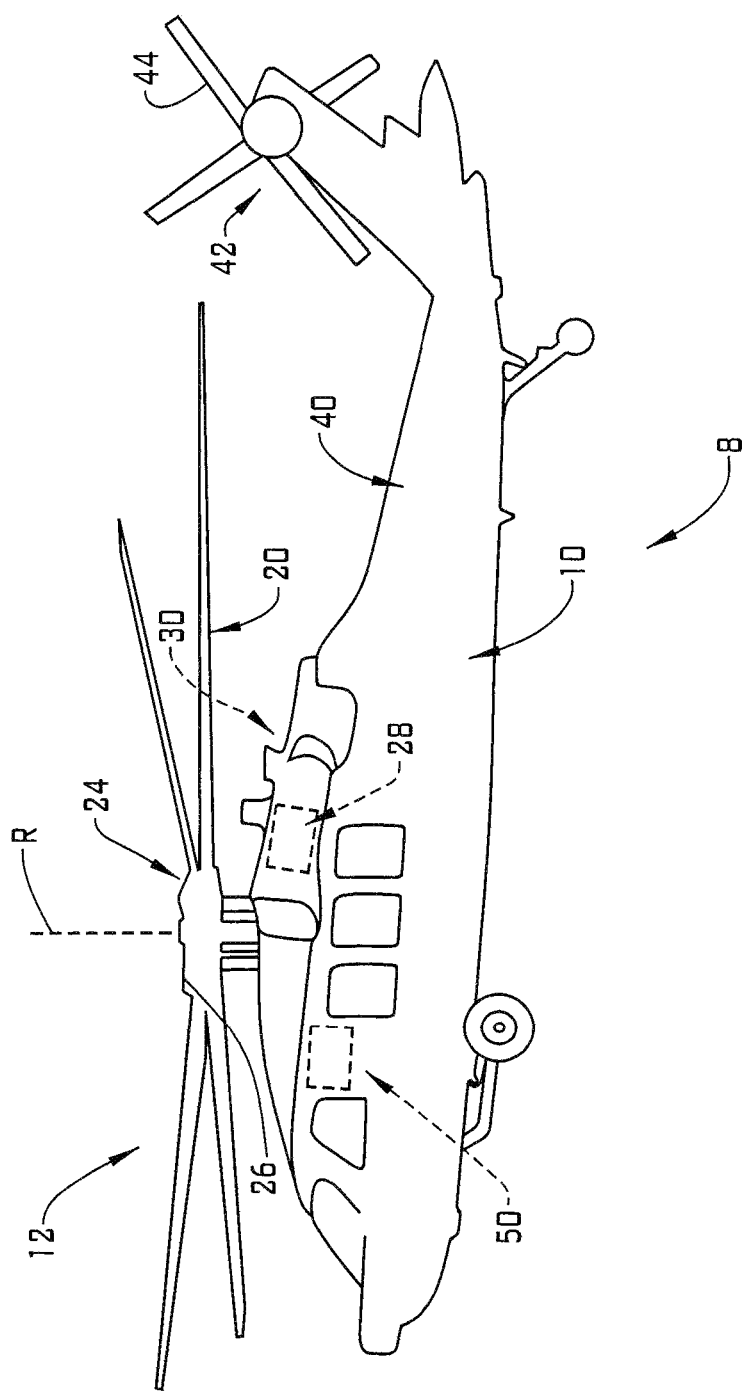
FIG. 1 depicts a rotary wing aircraft including an actuator system, in accordance with an aspect of an exemplary embodiment.

A vertical take-off and landing (VTOL) or rotary wing aircraft, in accordance with an exemplary embodiment, is generally indicated at 8 in FIG. 1. Rotary wing aircraft 8 including a fuselage 10 that supports a main rotor system 12, which rotates about a main rotor axis R. Main rotor system 12 includes a plurality of rotor blades 20 rotatable about a main rotor axis "R". Plurality of rotor blades 20 is mounted to a rotor hub 24. Each of the plurality of rotor blades 20 may be connected to a corresponding one of a plurality of hydraulic and/or electromechanical actuators, one of which is indicated at 26.

Main rotor system 12 is driven by a gearbox 28 coupled to one or more prime movers, indicated generally at 30. Aircraft 8 includes an extending tail 40 that supports a tail rotor system 42 including a plurality of tail rotor blades, indicted generally at 44. Tail rotor system 42 may be operatively coupled to gearbox 28 through a drive shaft (not shown). Rotary wing aircraft 8 includes an actuation system 50 that may be employed to control one or more elements. For example, actuation system 50 may be operatively connected to at least one control member such as one or more of the plurality of hydraulic and/or electromechanical actuators 26, a throttle (not shown) that controls prime movers 30, and/or any one of a plurality of control surfaces (also not separately labeled).

Figure 2:
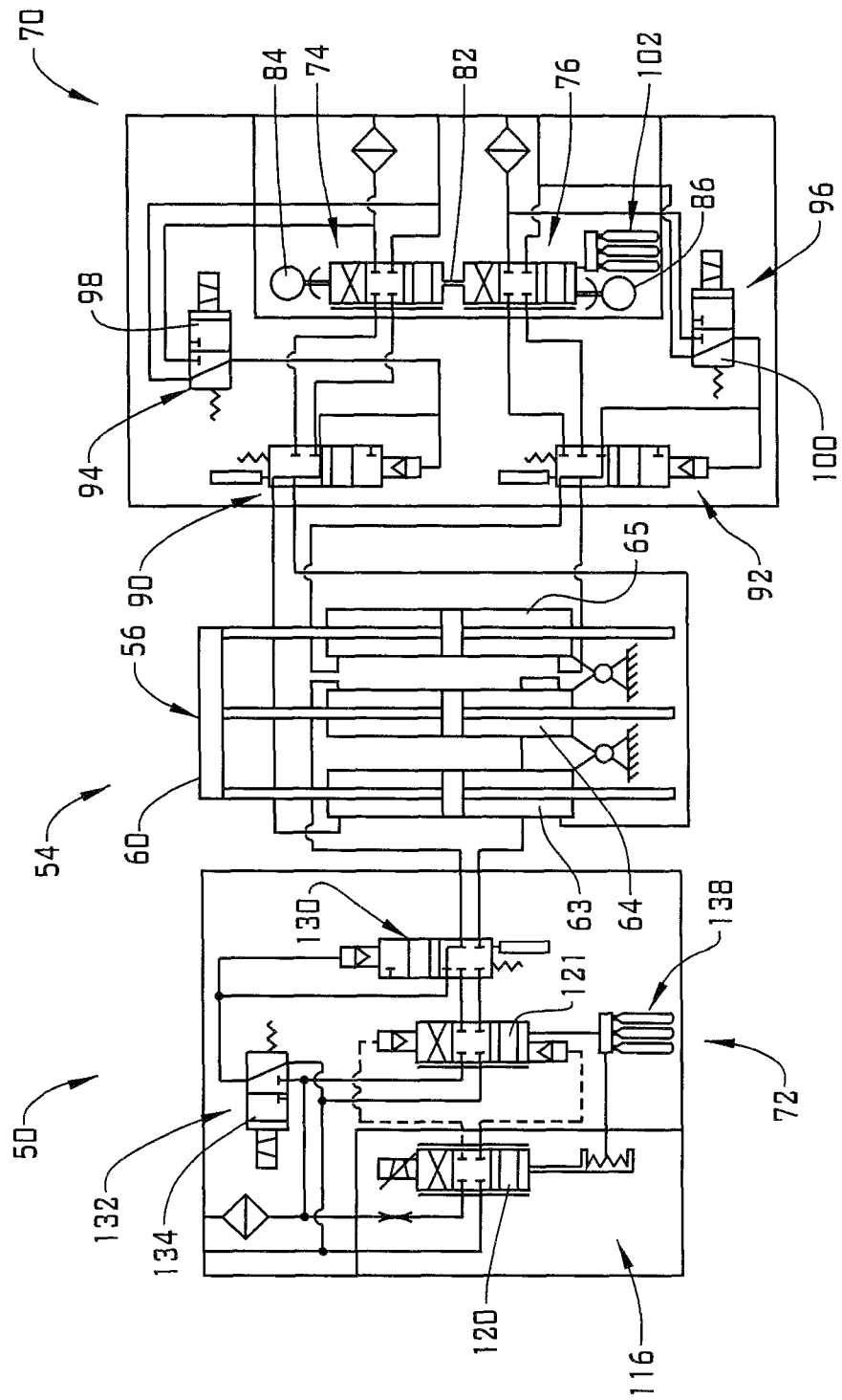
FIG. 2 depicts a schematic diagram illustrating an actuator, in accordance with an aspect of an exemplary embodiment.

Referring to FIG. 2, actuator system 50, in accordance with an exemplary embodiment, includes an actuator 54 which, in the exemplary embodiment shown, takes the form of a triplex actuator 56. Triplex actuator 56 includes an actuator member 60 that delivers an actuation force to the element controlled by actuator system 50. Actuator member 60 is operatively connected to a first hydraulic member 63, a second hydraulic member 64, and a third hydraulic member 65. The first, second, and third actuator members 63-65 provide the actuation force to actuator member 60.

Actuator system 50 also includes a control valve system 70 and a backup valve system 72. Control valve system 70 provides main or primary control actuator 60 and includes a first direct drive valve (DDV) 74 and a second DDV 76. First DDV 74 includes a first piston (not separately labeled) and second DDV 76 includes a second piston (also not separately labeled). In accordance with an exemplary aspect, the first piston is mechanically connected to the second piston through a linking member 82. Thus, any movement of the first piston is directly passed to the second piston and vice versa. In addition, first DDV 74 includes a first motor 84 operatively connected to the first piston and second DDV 76 includes a second motor 86 operatively connected to the second piston. Each of the first motor 84 and the second motor 86 is designed and sized to be capable or operating both the first and second piston should one motor become inoperable.

Control valve system 70 is also shown to include a first bypass valve 90 operatively connected to first DDV 74 and actuator member 63, and a second bypass valve 92 operatively connected to second DDV 76 and actuator member 65. First bypass valve 90 establishes one of an active, bypass and/or standby mode of first DDV 74/actuator member 63. Similarly, second bypass valve 92 establishes one of an active, a bypass and/or a standby mode of second DDV 76/actuator member 65. First bypass valve 90 is controlled by a first solenoid valve 94 and second bypass valve 92 is controlled by a second solenoid valve 96. In an embodiment, first solenoid valve 94 may take the form of a first triple coil solenoid valve 98 and second solenoid valve 96 may take the form of a second triple coil solenoid valve 100. First and second solenoid valves 94 and 96 receive control signal from an on-board control system (not shown) to establish an operating mode of first and second DDV's 74 and 76. The control system may receive feedback from an actuation position sensor 102 operatively connected to second DDV 76 or via DDV 74.

In further accordance with an exemplary aspect, backup valve system 72 includes an electro-hydraulic servovalve (EHSV) 116 including a first EHSV member 120 and a second EHSV member 121. Backup valve system 72 also includes a bypass valve 130 operatively connected to EHSV 116 and actuator member 64. In a manner similar to that discussed herein, bypass valve 130 establishes one of an active mode, a bypass mode, and/or a standby mode for EHSV 116/actuator member 64. By default, bypass valve 130 initially sets EHSV 116 in standby mode. In this manner, in the event first and second DDV's 74 and 76 become inoperable, EHSV 116 may control actuator member 60. Bypass valve 130 is operatively connected to a solenoid valve 132 which may take the form of a triple coil solenoid valve 134. An actuator position sensor 138 is operatively connected to EHSV member 121 to provide feedback of spool position or mode of EHSV 116. As an alternate architecture, EHSV 116 may also be replaced with a single DDV, similar to DDV 74 or DDV 76. Utilizing a back-up EHSV results in an architecture with dissimilar failure modes, while utilizing a back-up DDV results in a common architecture, each with different benefits.

At this point it should be understood that the exemplary embodiments describe an actuation system that utilizes two mechanically linked direct drive valves as main or primary control elements and an electro-hydraulic servovalve as a backup control element. By mechanically linking the two direct drive valves, the need for synchronization is eliminated. Also, a loss of hydraulic pressure to one of the two primary DDVs (74 or 76) or loss of either DDV motor (84 or 86) will not result in a position transient to actuator member 60. In this manner, the exemplary embodiments provide a technical effect of eliminating a force fight situation as there would not be a cyclical differential pressure concern due to a lack of synchronization. A static force fight may exist as a result of the manufacturing tolerances of the spools of DDV 74 and 76, however non-damaging to actuator 60.

What is claimed is:

1. An actuator system for an aircraft comprising:
an actuator including a plurality of hydraulic members;
a control valve system operatively connected to more than one of the plurality of hydraulic members of the actuator, the control valve system including a first direct drive valve (DDV) mechanically connected to a second DDV; and
a backup valve system operatively connected to an other of the plurality of hydraulic members the actuator, the backup valve system including one of an electro-hydraulic servovalve (EHSV) and a DDV, wherein the backup valve system is mechanically isolated from the control valve system.

2. The actuator system according to claim 1, wherein the control valve system includes a first motor operatively connected to the first DDV and a second motor operatively connected to the second DDV, each of the first and second motors being operable to actuate both the first DDV and the second DDV.

3. The actuator system according to claim 1, wherein the control valve system includes a first bypass valve connected to the first DDV, the first bypass valve establishing at least one of an active mode and a bypass mode of the first DDV and a second bypass valve connected to the second DDV, the second bypass valve establishing at least one of an active mode and a bypass mode of the second DDV.

4. The actuator system according to claim 3, further comprising: a first solenoid valve operatively connected to the first bypass valve and a second solenoid valve operatively connected to the second bypass valve.

5. The actuator system according to claim 1, wherein the backup valve system includes a bypass valve operatively connected to the one of the EHSV and DDV and further includes a solenoid valve operatively connected to the bypass valve.

6. The actuator system according to claim 1, wherein the actuator comprises a triplex actuator and the plurality of hydraulic members includes three hydraulic members.

7. The actuator system according to claim 1, wherein the backup valve system is hydraulically isolated from the control valve system.

8. The actuator system according to claim 1, wherein the control valve system operates the actuator via the more than one of the plurality of hydraulic members and the backup valve system operates the actuator via the other of the plurality of hydraulic members when the control valve system is inoperable.

9. The actuator system according to claim 1, wherein when the first DDV and the second DDV are inoperable, a bypass valve of the backup valve system connected to the one of the EHSV and the DDV becomes active.

10. An aircraft comprising:
a fuselage;
at least one control member supported at the fuselage; and
an actuator system operatively connected to the at least one control member, the actuator system comprising:
an actuator having a plurality of hydraulic members;
a control valve system operatively connected to more than one of the plurality of hydraulic members of the actuator, the control valve system including a first direct drive valve (DDV) mechanically connected to a second DDV; and
a backup valve system operatively connected to an other of the plurality of hydraulic members of the actuator, the backup valve system including one of an electro-hydraulic servovalve (EHSV) and a DDV, wherein the backup valve system is mechanically isolated from the control valve system.

11. The aircraft according to claim 10, wherein the control valve system includes a first motor operatively connected to the first DDV and a second motor operatively connected to the second DDV, each of the first and second motors being operable to actuate both the first DDV and the second DDV.

12. The aircraft according to claim 10, wherein the control valve system includes a first bypass valve connected to the first DDV, the first bypass valve establishing at least one of an active mode and a bypass mode of the first DDV and a second bypass valve connected to the second DDV, the second bypass valve establishing at least one of an active mode and a bypass mode of the second DDV.

13. The aircraft according to claim 12, further comprising: a first solenoid valve operatively connected to the first bypass valve and a second solenoid valve operatively connected to the second bypass valve.

14. The aircraft according to claim 10, wherein the backup valve system includes a bypass valve operatively connected to the one of the EHSV and DDV and further includes a solenoid valve operatively connected to the bypass valve.

15. The aircraft according to claim 10, wherein the aircraft comprises a vertical take-off and landing aircraft.

16. The aircraft according to claim 10, wherein the actuator comprises a triplex actuator and the plurality of hydraulic members includes three hydraulic members.

17. The aircraft according to claim 10, wherein the backup valve system is hydraulically isolated from the control valve system.

18. The aircraft according to claim 10, wherein the control valve system operates the actuator via the more than one of the plurality of hydraulic members and the backup valve system operates the actuator via the other of the plurality of hydraulic members when the control valve system is inoperable.

19. The aircraft according to claim 10, wherein when the first DDV and the second DDV are inoperable, a bypass valve of the backup valve system connected to the one of the EHSV and the DDV becomes active.

* * * * *